United States Patent

[11] 3,628,996

| [72] | Inventor | Carl D. Weber |
| | | Brecksville, Ohio |
| [21] | Appl. No. | 837,335 |
| [22] | Filed | June 27, 1969 |
| [45] | Patented | Dec. 21, 1971 |
| [73] | Assignee | Dow Corning Corporation |
| | | Midland, Mich. |

[54] POLYDIMETHYLSILOXANE RELEASE AGENT
5 Claims, No Drawings

[52] U.S. Cl. ................................................... 117/138.8 A,
117/76 P, 117/126 GS, 117/132 BS, 117/138.8
F, 117/138.8 N, 117/138.8 UA, 117/140 A,
117/142, 117/143 A, 117/148, 117/155 R, 260/18
S, 260/33.6 SB, 260/825
[51] Int. Cl. ...................................................... C08g 47/02,
D21h 1/34
[50] Field of Search .......................................... 260/825;
117/155, 138.8 A

[56] References Cited
UNITED STATES PATENTS

| 2,985,545 | 5/1961 | Leavitt | 260/825 |
| 2,985,546 | 5/1961 | Leavitt | 260/825 |
| 3,046,160 | 7/1962 | Dengler | 260/825 |
| 3,070,566 | 12/1962 | Nitzsche et al. | 260/825 |
| 3,061,567 | 10/1962 | Keil | 260/825 |

*Primary Examiner*—Samuel H. Blech
*Attorneys*—Robert F. Fleming, Jr., Laurence R. Hobey and Harry D. Dingman ABSTRACT: Release agents which give superior release against aggressive adhesives are made by mixing (1) a hydroxyl endblocked polydimethylsiloxane having a viscosity of at least 350 cs. and (2) either from 25 to 75 percent by weight of a triorganosiloxy endblocked dimethylpolysiloxane or from 10 to 75 percent by weight of a polydimethylsiloxane having a triorganosiloxy group on one end and a hydroxyl on the other, (2) having a viscosity of at least 4000 cs. at 25° C. and (3) a cross-linker for (1).

POLYDIMETHYLSILOXANE RELEASE AGENT

The use of methylpolysiloxanes as release agents dates from the beginning of the organosiloxane industry but the use of the organopolysiloxanes to release commercial adhesives from packages and the like was given a tremendous impetus with the advent of the invention described in U.S. Pat. No. 3,061,567. This patent relates to the use of organopolysiloxanes having hydroxyls on the ends of the molecules plus a cross-linker to produce cured release coatings on paper and other substrates. The patent specifically states that the presence of materials having triorganosilyl groups on both ends of the molecule or of cyclic siloxanes which are hydroxyl free should be avoided because of the danger of transfer of the siloxane to the adhesive surface thereby ruining the adhesive qualities of the adhesive. This rule has been generally followed in the organosilicon release art since that time.

However, applicant has unexpectedly found that by the inclusion of large amounts of organosiloxanes having triorganosiloxy groups on both ends of the molecule or of those having triorganosiloxy groups on one end of the molecule (provided these materials have a certain critical viscosity) give superior release for the so-called aggressive adhesives. The term aggressive adhesive as employed in this invention refers to those organic compounds which give an adhesion of at least 1,200 grams when measured on a stainless steel panel on an Instron machine at a pull rate of 500 inches per minute. The release agents of this invention are effective against any aggressive adhesive regardless of its composition as far as it is presently known. It should be understood, of course, that the material is also quite effective against nonaggressive adhesive such as that on Scotch Tape and other materials employed in the art.

This invention relates to a composition giving improved release when cured on a substrate especially towards aggressive adhesives consisting essentially of (1) a SiOH ended benzene soluble dimethylpolysiloxane of at least 350 cs. viscosity at 25° C., (2) from 25 to 75 percent by weight based on the combined weights of (1) and (2) of a benzene soluble dimethylpolysiloxane having triorganosiloxy groups on each end of the molecule or from 10 to 75 percent by weight based on the combined weights of (1) and (2) of a polydimethylsiloxane having a triorganosiloxy group on one end of the molecule and a hydroxyl group on the other, (2) having a viscosity of at least 4,000 cs. at 25° C. and (3) a cross-linker for (1).

This invention also relates to a flexible substrate having the cured composition above described on the surface thereof.

For the purpose of this invention (1) can be any polydimethylsiloxane having a viscosity of at least 350 cs. and having hydroxyl groups on the ends of the molecules. These are primarily dimethylsiloxanes but it is to be understood that the compounds can also contain incidental hydroxyl groups along the chain which are normally produced in the production of polydimethylsiloxane by alkaline polymerization. In other words, the polydimethylsiloxane can contain incidental amounts of monoorganosiloxane units. It can also contain incidental amounts of diorganosiloxane units other than dimethylsiloxane which do not adversely affect the release properties of the cured coating. These compositions are well known articles of commerce and no further description is needed here.

The novel ingredient (2) of this invention can be present in two different proportions depending upon its nature. When the ingredient (2) has triorganosiloxy groups on both ends of the molecule it should be present in amount from 25 to 75 percent by weight based on the weight of (1). If the material is present in amount less than 25 percent improved release is not obtained. Furthermore, if the viscosity of (2) is less than 4,000 cs. at 25° C., an inordinate amount of transfer of the siloxane to the adhesive surface is obtained and this makes the composition inoperative for applicant's purpose.

The second variation of (2) are those compounds having a triorganosiloxy group on one end of the molecule and a hydroxyl group on the other. In this case, the amount of (2) can be as low as 10 percent by weight based on the combined weight of (1) and (2). The upper limit is the same as in the previous case. It should be understood, of course, that (2) can be added as a pure species that is as a siloxane having triorganosiloxy groups on both ends or as a siloxane having triorganosiloxy on one end or as a combination of the two. Furthermore, ingredient (2) can, if desired, be added in admixture with a poly siloxane having hydroxyl groups on both ends of the molecules.

Commercial preparation of siloxanes of the type (2) is often done by equilibrating cyclic dimethylsiloxanes with hexa-organodisiloxanes. Such a method produces a mixture of molecules some of which have triorganosiloxy groups on both ends, some of which have triorganosiloxy groups on one end and some of which have hydroxyl groups on both ends. Such materials are operative herein provided the total amount of material having triorganosiloxy groups on at least one end of the molecule is in the range specified above.

(2) is primarily a triorganosiloxy endblocked dimethylsiloxane, but it can contain incidental amounts of other diorganosiloxane units, (as for example in example 2), which do not adversely affect the release characteristics of the cured coating.

The triorganosiloxy groups on the ends of the molecule of this invention can have any hydrocarbon or halohydrocarbon substituents such as alkyl groups, such as methyl, ethyl, propyl, butyl, or hexyl; aryl groups such as phenyl, tolyl, xenyl; and aralkyl hydrocarbon groups such as benzyl, beta-phenylethyl or beta-phenylpropyl. The hydrocarbon groups can also be alkenyl groups such as vinyl, allyl or hexenyl; or cycloaliphatic groups such as cyclopentyl, cyclohexyl or cyclohexenyl. The groups can also be halo-substituted hydrocarbon radicals such as chloromethyl, chloropropyl, bromophenyl, 3,3,3-trifluoropropyl, $\alpha,\alpha,\alpha$-trifluorotolyl or chlorophenyl. Preferably, the organosiloxy groups have from one to 12 carbon atoms.

The organopolysiloxanes are cured by means of the standard well known cross-linkers (3) for curing siloxanes via reaction with silicon bonded hydroxyl groups. As is well known, these cross-linkers include those silanes, polysiloxanes, silicates or polysilicates having functional groups on the silicon. Examples of such silanes are acetoxy containing silanes or siloxanes, ketoxime containing silanes or siloxanes, alkoxy containing silanes or siloxanes and SiH containing silanes or siloxanes. Obviously, in order to function as a cross-linker there must be at least three functional groups per molecule in the cross-linker. For the purpose of this invention it is preferred that the cross-linker be either an SiH containing silane or polysiloxane or an alkoxy containing silane or polysiloxane or combinations thereof.

The term "functional group on silicone" means any silicon-bonded group which hydrolyzes in the presence of water at room-temperature plus the H atom. Examples of such groups are acyloxy such as acetoxy, formoyloxy or propionyloxy; ketoxime such as $SiON=CR_2$ where R is methyl, ethyl, cyclohexyl, vinyl or butyl; alkoxy such as methoxy, ethoxy, $\beta$-chloroethoxy, $\beta$-methoxy-ethoxy, $-O(CH_2CH_2O)_2CH_3$ and isoproposy; amino i.e. $SiNR_2$ or oxyamino i.e. $SiONR_2$ where R is as defined above.

As is also well known the curing of hydroxyl containing siloxane by means of cross-linkers of the types specified above often require a curing catalyst. For the purpose of this invention the curing catalyst can be any of those used to cause reaction of a silicon-bonded hydroxyl group with a functional group on silicon. The preferred catalyst or organometallic materials such as the carboxylic acid salts of metals such as lead, tin, manganese, iron, cobalt, nickel, and the like; or titanates such as alkyl titanates or aceyl titanates or the corresponding zirconates. The catalysts can also be basic compounds such a amines, hydroxyl amines and the like. The preferred catalysts employed with this invention are tin salts of carboxylic acids or mercapto tin salts such as dibutyltin diacetate, dibutyl tin dilaurate, dibutyl tin dioctate, stannous octoate, di-N-octyl tin-S,S-di-isooctylmercaptoacetate, dibutyl tintS,S-dimethyl mercaptoacetate or diethyl tin-S,S-dibutylmercaptoacetate.

The preparation of the composition of this invention involves merely mixing the ingredients in any order. Obviously, it is preferable that the catalyst and the cross-linker be kept separate until one is ready to apply the coating to the substrate.

The composition of this invention can be applied to any substrate such as metal, organic plastic, or fibrous substrates such as wood, leather, paper and fabrics such as glass cloth, cotton, polyester, polyacrylonitrile or polyamide. The preferred substrates are paper or paper coated with plastic such as polyethylene or polypropylene.

The aggressive adhesives for which the composition of this invention are particularly effective are known organic materials. The composition of these materials varies quite widely. Each manufacturer has his proprietary formulation; however, specific examples of such adhesives are those derived from butadiene-styrene copolymers or those derived from polyvinylethylether. The compositions of this invention are, of course, quite effective for releasing normal sticky materials such as asphalt, raw rubber, foodstuffs, glues and pressure sensitive adhesives in general.

In each of the examples shown below the release agent was tested by applying a 5 percent solution in xylene with a number 14 wire-wound rod to densified Kraft paper and then curing the coating 30 seconds at 325° F. In some runs the release properties were checked immediately after cure, but in others the cured coating was aged at 73° F. at 50 percent relative humidity for 20 hours before testing.

The release properties of the coating were checked by applying to the surface thereof an aggressive adhesive which had been placed on Mylar backing. The amount of force required to pull the Mylar from the release coating was then measured and the adhesive was then applied to a steel panel and the adhesion to the steel panel was measured to give the so-called subsequent adhesion. This is a test of the transfer of the siloxane.

In some cases, the adhesion and transfer were also checked with Scotch Tape. The tape was applied to the surface of the cured silicone, then removed, and the adhesion of the tape to itself was checked. If the tape did not adhere to itself it was a showing that the siloxane had transferred to the adhesive and that the coating was inoperative for commercial release applications.

The following examples are illustrative only and should not be construed as limiting the invention which is properly delineated in the appended claims.

EXAMPLE 1

This example shows the effect of the concentration of (2) on the release values obtained with an aggressive adhesive of the butadiene-styrene type called S-227 adhesive.

Ingredient (1) employed in this example was a polydimethylsiloxane gum having silicon bonded hydroxyl groups on the end of the molecules and a plasticity of 90 as measured by ASTM D-926-67 using a ball sample.

Ingredient (2) was a dimethylvinylsiloxy endblocked polydimethylsiloxane gum containing incidental SiOH groups. The two ingredients were mixed in proportions shown below together with, in each case, 2 percent by weight of a low molecular weight hydroxyl endblocked dimethylpolysiloxane* having a viscosity of about 30 cs. at 25° C. There was used in each case (3) 1 percent by weight based on the combined weight of (1), (2) and (3) of a trimethylsiloxy endblocked methylhydrogenpolysiloxane cross-linker of 25 cs. viscosity. The mixture was dissolved in xylene to give a 5 percent by weight solution and one drop of dibutyl tin dilaurate was added for every 25 cc. of solution. The solution was applied to paper, cured and tested as shown above. The results were given in the table below:

*Optional ingredient.

| Percent by weight (1) | Percent by weight (2) | Release in grams [1] | Subsequent adhesion in grams |
|---|---|---|---|
| 98 | 0 | 66 | 1,400 |
| 88 | 10 | 65 | 1,150 |
| 78 | 20 | 74 | 1,100 |
| 68 | 30 | 43 | 1,050 |
| 58 | 40 | 33 | 1,050 |
| 48 | 50 | 37 | 1,050 |

[1] At 500 inches per minute checked immediately after cure.

EXAMPLE 2

Formulation A was 70 percent by weight of (1) a 90 plasticity devolatilized hydroxyl endblocked polydimethylsiloxane drum (2) 30 percent by weight of a copolymer gum of 0.162 mol percent dimethylvinylsiloxane, 0.659 mol percent methylvinylsiloxane and 99.179 mol percent dimethylsiloxane and (3) 1 percent by weight of a methylhydrogen polysiloxane of 30 cs. viscosity. Formulation B was included by comparison and was 99 percent by weight of a hydroxyl endblocked polydimethylsiloxane gum and 1 percent by weight of a methylhydrogen polysiloxane of 30 cs. viscosity. Each of the samples was applied as above to densified Kraft paper and checked with 227 adhesive the results were as follows:

| Formulation | Release | | Subsequent adhesion | |
|---|---|---|---|---|
| | Immediately after curing | Post curing 24 hrs. at 73° F. | Immediately after cure | After post curing 20 hrs. at 73° F. |
| A | 69 | 61 | 1,200 | 1,300 |
| B | 131 | 103 | 1,300 | 1,250 |

In both of the above cases the catalyst was dibutyl tin dioctoate.

EXAMPLE 3

This example shows the release obtained with polyethylvinylether aggressive adhesive sold under the name A-27.

A 5 percent xylene solution of the mixture of
1. 70 percent by weight of a SiOH endblocked polydimethylsiloxane gum having a plasticity of 90,
2. 28 percent by weight of a dimethylvinylsiloxy endblocked polydimethylsiloxane gum, and
3. 2 percent by weight of a hydroxyl endblocked dimethylpolysiloxane having a viscosity of 30 cs., was mixed with 3 percent by weight based on the weight of (1), (2) and (3) of a trimethyl endblocked methylhydrogen polysiloxane of 30 cs. viscosity. The solution was catalyzed with dibutyl tin dioctoate and applied to glassine paper and to Mylar film. In each case the coated substrate was cured at 1 minute at 350° F. The release of the cured coating was checked as shown above and it was found that the release from the glassine substrate was 10 grams per inch and from the Mylar substrate was 22 grams per inch at both a pull rate of 500 inches per minute.

EXAMPLE 4

This example shows the use of silicates as the cross-linking agent. The release material in this invention was a 50 percent by weight mixture of ingredients (1) and (2) of example 1 catalyzed with dibutyl tin dioctoate. In each case the coating was aged 20 hours at 73° C. and then checked with S—227 adhesive. In formulation A the cross-linker used was 3 percent by weight of β-methoxyethoxy, orthosilicate, and in formulation B the cross-linker used was 3 percent by weight ethylpolysilicate. In both cases the weight of cross-linker is based on the combined weights of (1) and (2). Formulation A gave a release value of 68 percent and a subsequent adhesion of 900. Formulation B gave a release value of 95 and a subsequent adhesion of 1,100.

EXAMPLE 5

This example shows the use of a low viscosity hydroxyl endblocked fluid as (1). A mixture of 50 percent by weight of a 4,000 cs. hydroxyl endblocked polydimethylsiloxane and 50 percent by weight of a dimethylvinyl endblocked dimethylpolysiloxane gum was mixed with 3 percent by weight of a methylhydrogen siloxane of 30 cs. viscosity. The coating was formed into a 5 percent xylene solution, catalyzed with dibutyl tin dioctoate and then cured by the standard conditions. After heat aging the adhesion was checked with 227 adhesive. The release value was 81 and the subsequent adhesion value was 1,175.

EXAMPLE 6

This example shows the criticality of the lower limit of the viscosity of (2) when (2) is a triorganosiloxy endblocked dimethylpolysiloxane. Each formulation shown below was composed of 98 percent by weight of a 50—50 mixture of (1) a hydroxyl endblocked polydimethylsiloxane and (2) a trimethylsiloxy endblocked dimethylpolysiloxane having the viscosity shown below, 1 percent by weight of a hydroxyl endblocked dimethylpolysiloxane of 30 cs. viscosity and 1 percent by weight of a methylhydrogen polysiloxane of 30 cs. viscosity. Each sample was catalyzed with dibutyl tin dioctoate. Each sample was cured as shown above and checked for migration with Scotch Tape as shown above.

| Viscosity of (2) at 25° C. | Tape stuck |
|---|---|
| 100 | No |
| 1,000 | No |
| 3,000 | No |
| 12,500 | Yes |
| 30,000 | Yes |
| 100,000 | Yes |

EXAMPLE 7

In the following examples the adhesion and release values of the various formulations were checked with Scotch Tape and 227 adhesive by the standard test shown above. Each formulation was cured by the standard test and in each case the catalyst was 3 percent by weight dibutyl tin dioctoate based on the weight of the siloxane. After curing each sample was aged 20 hours at 73° F. at 50 percent relative humidity in accordance with the standard test.

Composition A was included for comparison. It was composed of 99 percent by weight of hydroxyl endblocked polydimethylsiloxane gum and 1 percent by weight of a methylhydrogen siloxane of 30 cs. viscosity.

Composition B was 97 percent by weight of mixture of 50 percent by weight mixture of a hydroxyl endblocked polydimethylsiloxane gum and 50 percent by weight of a 5,376 cs. polysiloxane having butyldimethylsiloxy groups on one end of the molecule and hydroxyl on the other, 2 percent by weight of a hydroxyl endblocked polydimethylsiloxane of 30 cs. viscosity and 1 percent by weight of a methylhydrogen siloxane of 30 cs. viscosity.

Composition C was
97 percent by weight of a mixture of
50 percent by weight of a hydroxyl endblocked polydimethylsiloxane
gum and
50 percent by weight of a 12,500 cs. mixture of
33.3 percent* by weight of dimethylpolysiloxane having trimethylsiloxy
groups on one end of the molecule and hydroxyl
on the other and
66.66 percent by weight of a hydroxyl endblocked dimethylpolysiloxane,
2 percent of a hydroxyl endblocked polydimethylsiloxane
of 30 cs. viscosity and
1 percent by weight of a methylhydrogensiloxane of a 30 cs. viscosity.

The results are shown in the table below:

| | Scotch tape test | | S-227 adhesive test | |
|---|---|---|---|---|
| Composition | Release | Migration | Release | Subsequent adhesion |
| A | Excellent | Very slight | 160 | 1,250 |
| B | do | Slight | 40 | 1,000 |
| C | do | do | 50 | 1,150 |

*This represents the use of a mixture of (2) and a hydroxyl endblocked fluid. The proportions of (1) and (2) are therefore 16.65 percent (2) and 83.35 percent (1) (i.e. 50 percent in the form of the gum and 33.35 percent in the form of the 12,500 cs. fluid).

EXAMPLE 8

Equivalent results are obtained when the polydimethylsiloxane gum (2) of example 1 is endblocked with the following triorganosiloxy groups:

phenyldimethylsiloxy
3,3,3-trifluoropropyldimethylsiloxy
triethylsiloxy
β-phenylethyldimethylsiloxy.

decyldimethylsiloxy
cyclohexyldimethylsiloxy

I claim:
1. A method of obtaining improved release of aggressive adhesives which comprises positioning between the substrate and the aggressive adhesive, a cured film consisting essentially of
   1. SiOH endblocked benzene soluble dimethylsiloxane of at least 350 cs. viscosity,
   2. from 25 to 75 percent by weight based on the combined weight of (1) and (2) of a benzene soluble dimethylpolysiloxane having triorganosiloxy groups on both ends of the molecule or from 10 to 75 percent by weight based on the weight of (1) and (2) of a dimethylpolysiloxane having triorganosiloxy groups on one end of the molecule and hydroxyls on the other, (2) having viscosity of at least 4,000 cs., and
   3. a cross-linker for (1), the organic groups in said triorganosiloxy groups being monovalent hydrocarbon or halohydrocarbon groups of from one to 12 carbon atoms.
2. The method of claim 1, in which the substrate is paper.
3. The method of claim 1 in which the substrate is a flexible organic sheet.
4. The method of claim 1 in which the cross-linker is methylhydrogen siloxane.
5. The method of claim 4 in which the film is cured using a tin salt of a carboxylic acid or a mercapto tin salt.

* * * * *